United States Patent [19]

Uskali et al.

[11] Patent Number: 5,455,499
[45] Date of Patent: Oct. 3, 1995

[54] METHOD AND APPARATUS FOR INDICATING A BATTERY STATUS

[75] Inventors: Robert G. Uskali, Schaumburg, Ill.; David B. Bell, Los Altos, Calif.

[73] Assignee: Motorola, Inc., Schaumburg, Ill.

[21] Appl. No.: 51,983

[22] Filed: Apr. 26, 1993

[51] Int. Cl.⁶ ........................ H02J 1/04
[52] U.S. Cl. ...................... 320/43; 320/48
[58] Field of Search .............. 320/43, 44, 48; 324/426, 427, 428, 435; 340/636

[56] References Cited

U.S. PATENT DOCUMENTS

| | | | |
|---|---|---|---|
| 3,778,702 | 12/1973 | Finger | 320/48 X |
| 4,377,787 | 3/1983 | Kikuoka et al. | 324/431 |
| 4,387,334 | 6/1983 | Loper | 320/44 |
| 4,390,841 | 6/1983 | Martin et al. | 324/427 |
| 4,455,523 | 6/1984 | Koenck | 320/43 |
| 4,525,055 | 6/1985 | Yokoo | 320/48 X |
| 4,553,081 | 11/1985 | Koenck | 320/43 |
| 4,638,237 | 1/1987 | Fernandez | 320/48 |
| 4,677,363 | 6/1987 | Kopmann | 320/44 |
| 4,709,202 | 11/1987 | Koenck et al. | 320/43 |
| 4,724,528 | 2/1988 | Eaton | 320/43 X |
| 4,845,419 | 7/1989 | Hacker | 320/39 |
| 4,914,393 | 4/1990 | Yoshido | 324/428 |
| 5,032,825 | 7/1991 | Kuznicki | 340/636 |
| 5,043,651 | 8/1991 | Tamura | 320/43 |
| 5,065,084 | 11/1991 | Oogita | 320/48 |
| 5,115,182 | 5/1992 | Ehmke et al. | 320/48 X |
| 5,130,659 | 7/1992 | Sloan | 324/435 |
| 5,144,218 | 9/1992 | Bosscha | 320/44 |
| 5,164,761 | 11/1992 | Isono et al. | 354/468 |
| 5,229,704 | 7/1993 | Knepper | 320/43 X |
| 5,248,929 | 9/1993 | Burke | 320/48 |

Primary Examiner—Kristine L. Kincaid
Attorney, Agent, or Firm—Val Jean F. Hillman

[57] ABSTRACT

A battery-status-indicating apparatus and arrangement for use with electronic equipment (100) provides an operator with a displayed indication of remaining battery capacity. A removable battery pack (35) contains memory (37) for storing battery identification information, battery capacity information and a time stamp signal. Electronic circuitry (100), powered by the battery pack (35), maintains current time information and generates the time stamp signal for delivery to said removable battery (35). In addition, the electronic circuitry (100) comprises memory (30) for storing circuit module current draw signals ($I_1$–$I_4$) and battery discharge rate signals ($I_5$) representative of a discharge rate for different type battery chemistries. A microprocessor (27) containing a real time clock (31) is programmed to determine a battery discharge amount during a time interval ($T_5$) when the battery is removed from service as well as a battery consumption amount during circuit operation ($T_1$–$T_4$). The microprocessor (27) is also programmed to determine a scaling factor for use in determining a battery consumption amount as multi configuration battery packs (35) are utilized.

22 Claims, 6 Drawing Sheets

| CIRCUIT MODULE / ID | MODE | CURRENT |
|---|---|---|
| TRANSMITTING CKT | STANDBY | 60mA |
| TRANSMITTING CKT | TRANSMIT | 900mA |
| RECEIVING CKT | RECEIVE | 50mA |
| CONTROLLER | STANDBY | 180uA |
| CONTROLLER | INTERNAL | 40mA |
| IR | STANDBY | 10uA |
| IR | TRANSMIT | 250mA |
| IR | RECEIVE | 50mA |
| MODEM | DISABLED | 400uA |
| MODEM | STANDBY | 4mA |
| MODEM | ENABLED | 40mA |
| POWER SUPPLY | STANDBY | 750uA |
| POWER SUPPLY | OPERATE | 2mA |
| POWER SUPPLY | SHUTDOWN | 100uA |
| KEY INPUT | OPERATE | 10mA |
| DISPLAY | ON | 20mA |
| DISPLAY DRIVER | ON | 100mA |
| MICROPHONE | ON | 30mA |
| SPEAKER | ON | 20mA |
| MEMORY | ENABLED | 200uA |
| NiCd BATTERY | DISCHARGE | 250uA |
| NiMH BATTERY | DISCHARGE | 750uA |
| NICKEL-ZINK BATTERY | DISCHARGE | 250uA |

METHOD AND APPARATUS FOR INDICATING A BATTERY STATUS

FIELD OF THE INVENTION

This invention relates to a battery-status-indicating arrangement for use with electronic circuitry.

BACKGROUND OF THE INVENTION

Portable battery powered electronic systems are presently being extensively utilized in a wide range of applications. For example, such systems are being employed in mobile radiotelephone communication sets, portable personal computers, portable camera equipment and the like. In each, the electronic equipment comprising the overall system is controllably put into operation by electric current supplied from an electro-mechanical storage media (battery).

A current industry trend is towards the use of removable and rechargeable batteries or battery packs. In order to avoid an equipment failure, however, it is crucial that the system operator be provided an indication of how long the electronic system can further be put into operation by an existing battery. Moreover, since batteries tend to discharge over extended periods of non-use, it is crucial that each battery powered electronic system comprise a battery-discharge-indicating arrangement to provide the system operator with an indication of the remaining battery capacity for batteries which have not been in use for a period of time.

SUMMARY OF THE INVENTION

Briefly described, the present invention is a battery-status-indicating apparatus and arrangement for use with electronic circuitry to provide an operator with a displayed indication of remaining battery capacity. According to one aspect of this invention, a battery-discharge-indicating apparatus and arrangement comprises method steps and apparatus structure for storing battery identification information, battery capacity information and a time stamp signal within a battery pack memory unit. Within the electronic circuitry provisions are made for maintaining current time measurements and generating the time stamp signal for delivery to said battery pack. In addition, the electronic circuitry comprises memory for storing battery discharge rate signals representative of an amount of battery discharge exhibited by different battery chemistry types. A microprocessor, coupled to the memory means and the timing means and further responsive to signals received from the battery pack, is programmed to determine a battery discharge amount for a time interval when the battery pack is removed from service. The microprocessor is also programmed to update the battery capacity information stored in the battery pack memory unit, after determination of the discharge amount, and to cause the updated battery capacity information to be displayed.

According to another aspect of the present invention, a battery-consumption-indicating apparatus and arrangement comprises method steps and apparatus structure for storing battery identification information, battery capacity information and a time stamp signal within battery pack memory. Within the electronic circuitry provisions are made for maintaining current time measurements and generating the time stamp signal for delivery to said battery pack. In addition, the electronic circuitry comprises memory for storing current draw signals representative of an amount of current used by specific circuit modules comprising the electronic circuitry. A microprocessor, coupled to the memory means and the timing means and further responsive to signals received from the battery pack, is programmed to determine device consumption amounts during times when the circuit modules comprising the electronic circuitry are put into operation. The microprocessor is also programmed to scale said stored current draw signals in order to permit the use of multiple battery pack configurations, based at least partly upon the receipt of said identification information from the battery. Thereafter, the microprocessor operates to update the battery capacity information stored in the battery pack memory, after determination of the consumption amount, and to causes updated battery capacity information to be displayed.

BRIEF DESCRIPTION OF THE DRAWINGS

FIG. 5, a flow chart diagram illustrating the steps performed by the device 100 of FIG. 1 in accordance with the a battery-consumption-indicating arrangement of the present invention.

DETAILED DESCRIPTION OF A PREFERRED EMBODIMENT

The present invention has application for use within the field of consumer electronics. It is particularly suited for use with portable electronic systems which utilize removable and rechargeable batteries or battery packs. Such electronic systems include, but are not limited to personal computers, personal organizers, electronic notebooks, mobile radiotelephones, portable video cameras and the like.

Figure 1:
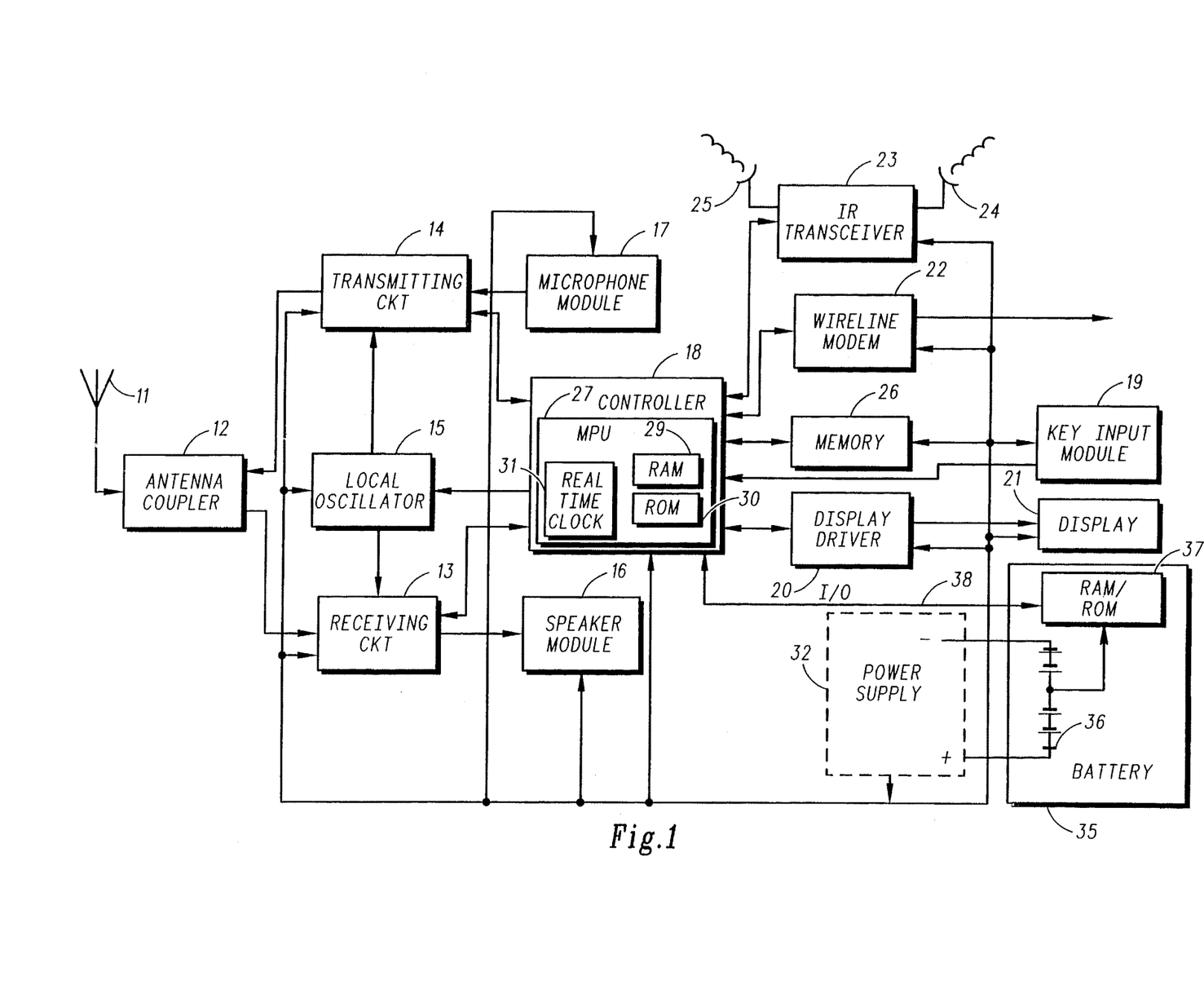
FIG. 1 is a block diagram of a mobile communications device that includes the battery-status-indicating arrangement of the present invention.

FIG. 1 is a block diagram of a mobile communications device 100 that comprises the battery-status-indicating arrangement according to the present invention. The device 100 is a portable personal communicator. The personal communicator 100 comprises an antenna 11, an antenna coupler 12, a radio frequency (RF) receiving circuit 13, an RF transmitting circuit 14, local oscillator (L.O.) 15, a speaker module 16, a microphone module 17, a controller 18 having a microprocessor 27, associated random access memory (RAM) 29, read only memory (ROM) 30 and real time clock 31 which indicates the present year, month, day, hour, minute, and second, a key input module 19, a display driver 20 and associated display unit 21 which is for example, a liquid crystal indication type for small size and low power consumption. In addition, the personal communicator 100 comprises a wire line modem 22, infrared (IR) transceiver 23 having transmitting and receiving lenses 24 and 25 respectively, and memory 26.

Personal communicator 100 is controllably put into operation by key input module 19. More specifically, the different circuit modules within the personal communicator 100 may be engaged or disengaged upon manipulation of key input module 19. For example, various arithmetic, algebraic, trigonometric and/or boolean calculations may be performed via key input module 19 in conjunction with controller 18. The output of the various calculations may be displayed by the display unit 21 which is driven by the display driver 20 as is known in the art.

Shown at 26 is a memory unit which stores time management and personal organizational information such as, but not limited to, a calendar, addresses, telephone numbers, meeting schedules, electronic mail messages and the like. Such information may be recalled from memory 26 and displayed via display unit 21 upon manipulation of key input module 19. In addition, this information may be communicated via the RF transceiver circuitry (i.e., antenna 11, coupler 12, RF transmitting circuit 14 and/or RF receiving circuit 13), wire line modem 22, or IR transceiver 23 upon manipulation of the key input module 19. As will be appreciated by those skilled in the art, key input module 19 must provide a device user with the ability to control all aspects of device operation and may be implemented via any of the well known man-machine interfaces currently available, such as, for example, alpha numeric keys, touch screens, graphic user interfaces, computerized information presentation systems, pressure or light sensitive wands, and voice recognition schemes.

Personal communicator 100 is usually maintained in a standby or a "sleep" mode of operation. During the "sleep" mode of operation, the various communication sections (e.g., RF, IR, and wire line) are disabled such that only device internal operations, such as, for example, arithmetic calculations, personal organization and time management are available. During the standby mode, however, the controller 18 drives the receiving circuit 13 and L.O. 15 of the RF section as well as the receiving circuit (not shown) for wire line modem 22 and IR transceiver 23 into an operation state to permit the receiving circuits of each respective communication section to receive an incoming signal.

Responsive to the receipt of an incoming signal the receiving circuit will deliver the incoming signal to the controller 18. If the incoming signal comprises a message not intended for the communicator 100, no action will be taken by controller 18. Assuming the incoming signal comprises a message intended for the communicator 100, the controller 18 will then and only then engage the transmitter circuit of the appropriate communication section. As is known in the art, the controller 18, will typically drive a tone generator (not shown) or some other alarm device alerting the device operator of the arrival of the incoming message.

With reference to the RF section, in the event of a received message, the L.O. 15 under direction from controller 18 supplies the receiving circuit 13 and transmitting circuit 14 with a frequency signal which specifies a communications channel. As a result, the communicator 100 is put into an RF communications mode of operation in which it can send and receive RF messages. Such messages may comprise data information as stored in memory unit 26 or voice signals generated in association with the use of the microphone and speaker modules 17 and 18. As is known in the art, wire line modem 22 and IR transceiver 23 operate in substantially a same manner as that described above in association with the RF section.

The communicator 100 can also be put into any of the various communications modes (e.g., RF, IR, and wire line) when the key input module 19 is manipulated by a device user to generate any of a plurality of communication start signals. Responsive to the receipt of a particular communication start signal, the controller 18 will drive the transmitter and receiver circuitry of the selected communications mode in a manner similar to that described above in association with the RF section.

From the forgoing, it should be appreciated that the transmitter circuits of communicator 100 are typically non-operational during the standby and "sleep" modes. As a result, the communicator 100 consumes different quantities of electrical current during standby, "sleep" and the available communications modes.

This is due to the fact that each specific circuit or module within the device 100 has associated therewith the consumption of a specific quantity of electrical current, hereinafter referred to as a current draw.

It is an aspect of the battery-consumption-indicating arrangement of the present invention to determine the current draw for each circuit module employed within the communicator 100. Such amounts are determined by measuring the current draw exhibited by a plurality of identical circuit modules, such as the RF transmitter circuit 14. This intrinsic data is averaged together to determine an average current draw for that particular circuit module. This type information gathering is performed for each circuit module employed by the communicator 100 in order to develop a look-up table comprising relevant circuit module current draws.

In accordance with a preferred embodiment, circuit module current draw values are stored in ROM 30 of controller 18.

Figure 2:
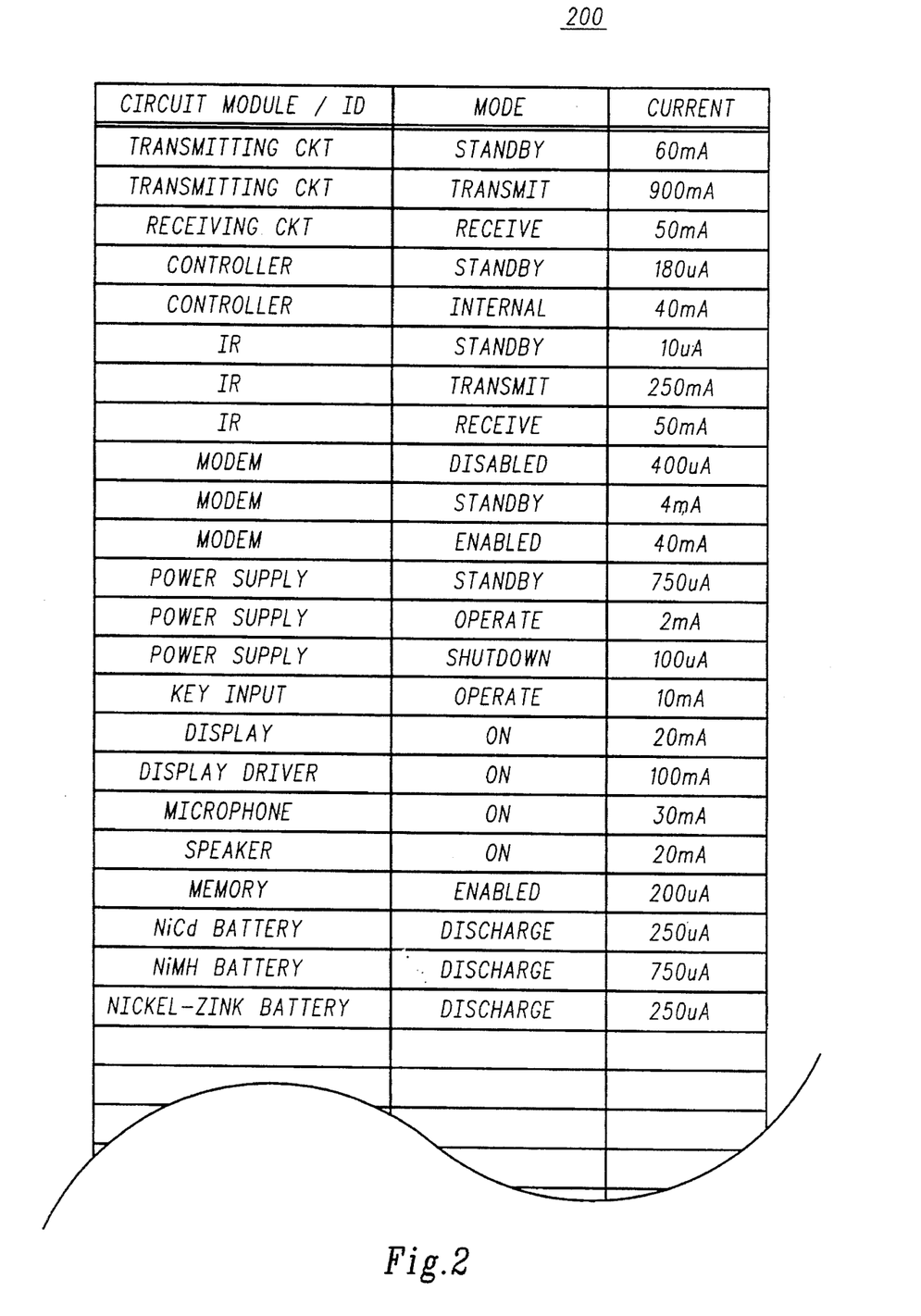
FIG. 2 illustrates a ROM look-up table for use during the a battery-status-indicating arrangement of the present invention.

Referring to FIG. 2, an illustration of the ROM 30 look-up table 200 is illustrated. In addition to information regarding individual circuit module current draws, the look-up table 200 may also maintain a current draw entry for the device 100 as operated in the standby, the "sleep", and the various communication_modes. In addition, look-up table 200 may contain information regarding battery chemistry discharge rates, as described herein below.

The battery-consumption-indicating arrangement of the present invention is for indicating battery status information to the operator of the device 100 regarding a remaining battery capacity for the battery pack 35.

In this effort, the present invention employs ROM look-up table 200 to store current draw signals representative of the current draw exhibited by each circuit module within the communicator 100. The battery-consumption-indicating arrangement further comprises a microprocessor based controller 18 having an operating instruction set stored in ROM 30 for measuring a time interval during which each circuit module is put into operation, thereby producing a time-duration signal indicative of a time interval a specific set of circuit modules are put into operation. Said operating instruction set is further operative to detect a change in the set of circuit modules as put into operation, thereby informing the microprocessor based controller 18 to commence measuring a second time interval during which a second set of circuit modules are put into operation, thereby producing a time-duration signal indicative of a time interval the second set of circuit modules are put into operation and so on. Said operating instruction set is further operative to sum the current draw signals for those circuit modules operational during a specified time-duration signal and thereafter multiply the current draw signal sum and the associated time-duration signal to produce a signal representative of a product of the summed current draw signals and the total time interval a specific set of circuit modules are put into operation. The product signals for each time-duration are then added to generate a consumption status signal for the battery pack 35.

Responsive to the consumption status signal, a display driver 20 for use with the display unit 21 indicates a remaining battery pack consumption status. The display driver may indicate, by use of a bar graph, for example the sum of the first and second multiplied signals as a consumed quantity of electricity which the device 100 has consumed up to the present time. Further, a value of percentage of the consumed quantity of electricity to a maximum quantity of electricity of battery 35 may be indicated instead of a bar graph. In accordance with the preferred embodiment, the indication provides a percentage value of the remaining amount of energy convertible to electricity with respect to an initial maximum amount of energy storable within the battery pack 35. As will be appreciated by those skilled in the art, the display driver may also be made to indicate how long the device 100 can further be put into operation by the battery pack.

Figure 3:
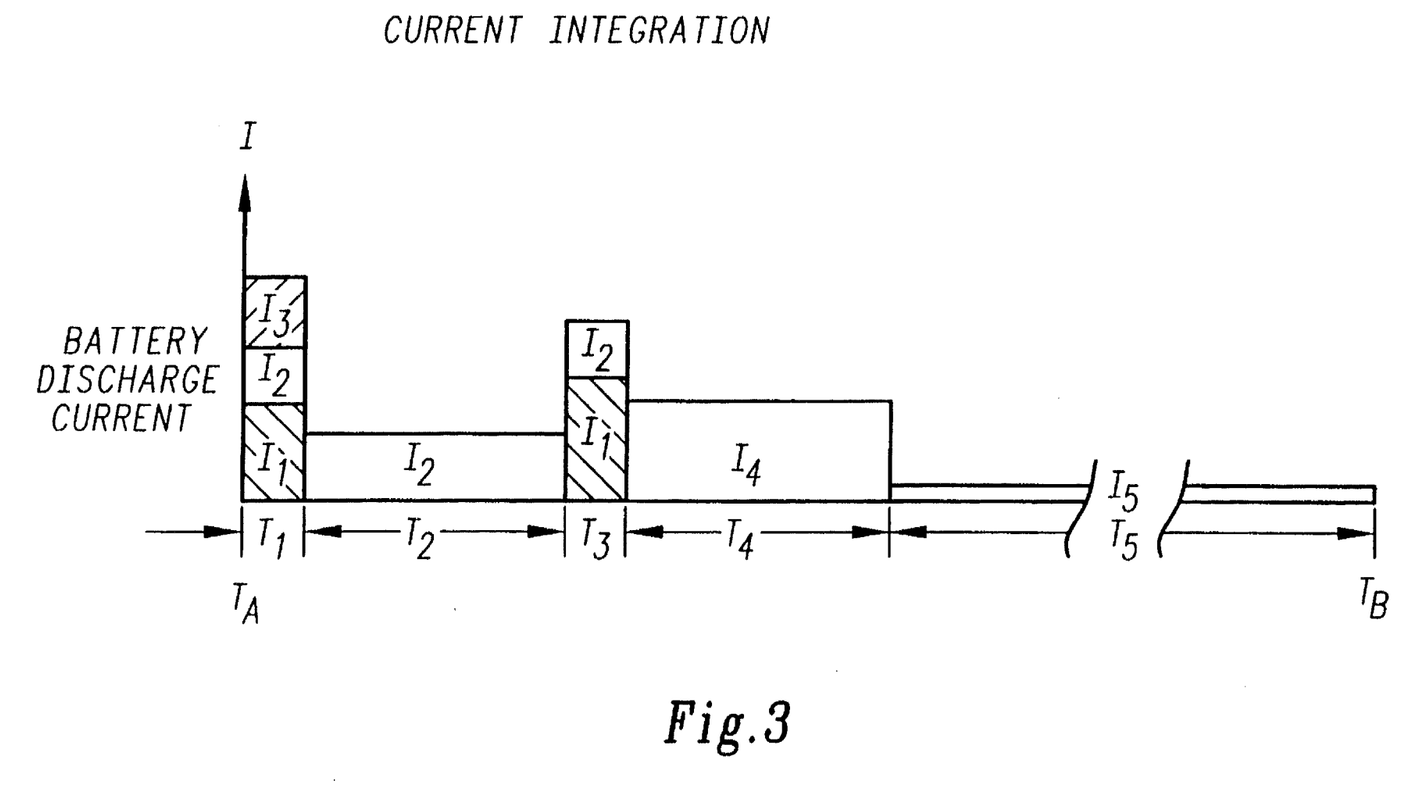
FIG. 3 shows a graphical example for use in describing the operation of the battery-consumption-indicating arrangement and the battery-discharge-indicating arrangement of the present invention.

FIG. 3 provides a graphical example for use in describing the operation of the battery-consumption-indicating arrangement and the a battery-discharge-indicating arrangement of the present invention. FIG. 3 shows a plot of battery discharge current (I(t)) vs. time (T). It will be appreciated by those skilled in the art that battery capacity used ($C_u$) is equal to the area under the curve of current vs. time as depicted in FIG. 3. Given an initial battery capacity, the remaining battery capacity can be determined in accordance with the following equations.

Battery capacity used ($C_u$) may be determined in accordance with the following equation:

$$Cu = \int_{Ta}^{Tb} I(t)dt \quad (1)$$

Remaining battery capacity (Cr) may be determined in accordance with the following equation:

$$Cr = Cb - Cu = Cb - \int_{Ta}^{Tb} I(t)dt \quad (2)$$

A normalized "fuel gauge" value representing remaining battery capacity (FG) in a percentage may be determined in accordance with the following equation.

$$FG = \frac{(Cb - Cu)}{Cb} \times 100 - \frac{Cr}{Cb} \times 100 \quad (3)$$

Where

Cu=battery capacity used;

Cb=battery capacity (constant value);

Cr=Remaining battery capacity (at time Tb);

Ta=Start time, battery fully charged; and

Tb=Time when capacity is to be determined.

To determine battery capacity used, the present invention employs current integration. Rather than measuring instantaneous current, discrete approximations of circuit module average current (i.e., current draw values) are employed. Thus, battery discharge current at any given time can be estimated in accordance with the following equations.

$$I(t) = \sum_{j=1}^{N} I_j \quad (4)$$

Where

I=Instantaneous battery discharge current;

$I_j$=circuit module time average current; and

N=Number of circuit modules used in battery discharge current estimation.

As shown in FIG. 3, battery discharge may be integrated with respect to time to arrive at a battery capacity usage value. A discrete integration approximation may be used to determine battery capacity usage. Using equation 4 for estimated instantaneous current, a discrete integration expression for battery capacity usage may be written as:

$$Cu = \sum_{k=1}^{M} T_k \times \left( \sum_{j=1}^{N} I_j \right)_k \quad (5)$$

Where $T_k$ is a discrete time interval; and

M is a number of times intervals for integration.

The time interval $T_k$ may be either a constant or a variable interval which is a power supply directed event.

As will be appreciated, FIG. 3 is a graphical example of equation 5. In accordance with the battery-consumption-indicating arrangement of the present invention, used battery capacity can be estimated as follows:

$$Cu = T_1*(I_1+I_2+I_3) + T_2*I_2 + T_3*(I_1+I_2) + T_4*I_4 \quad (6)$$

Where $T_1$, $T_2$, $T_3$ and $T_4$ are time-duration signals indicative of a time interval during which a set of specific circuit modules are put into operation and $I_1$, $I_2$, $I_3$ and $I_4$ are circuit module current draws.

In the foregoing example, it is assumed that when a particular circuit module is not in use its current draw can be neglected.

In accordance with the present invention, the battery pack 35 may be removed from the communicator 100 and recharged. As will be appreciated by those skilled in the art, a plurality of different battery chemistries may be employed by battery pack 35. Those anticipated for use by the present invention include Nickel Cadmium (NiCD, Lead Acid, Zinc Air, Nickel Metal Hydride (NiMH), Nickel-Zinc, Lithium/$MNO_2$, Lithium Ion, Lithium Polymer, and Lithium/Iron Sulfide batteries. Since the battery pack 35 is removable, certain steps must be taken to assure that battery capacity information is correctly maintained during a time when the battery pack is not in use.

It is an aspect of the a battery-discharge-indicating arrangement of the present invention to monitor battery self discharge (capacity lost due to internal battery leakage) when battery pack 35 is not in use and to provide the device operator with an updated battery consumption status when the battery pack 35 is returned to service. By way of example, if a 600 milliampere hour (maH) capacity battery is charged and left unconnected for a period of 1 month at a self discharge rate of 200 microamperes (uA), lost capacity may be determined as Cu=200 uA×744 hours/month×1 month=148 maH.

In accordance, nearly 25 percent of the total battery capacity is lost during a 1 month period of non-use. As is typical with most consumer electronics extended periods of non-use must be anticipated. Consequently, the magnitude of lost battery capacity due to non-use strongly suggests that self discharge must be accounted for if an accurate measure of battery capacity is to be presented to the device user.

In this effort, battery pack 35 employs ROM/RAM memory device 37. Such a device is known in the art and has in the past been available under part number DS2224 by contacting Dallas Semiconductor at 4401 South Beltwood Parkway Dallas Tex., 75244. As depicted in FIG. 1, static ROM/RAM 37 receives electrical current from battery cells 36. In this way, memory unit 37 will retain battery specific information even when the battery pack is removed from the device 100.

In accordance with the present invention memory unit 37 stores battery specific identification information such as, but not limited to battery chemistry information, battery capacity information, a number of battery cells 36, a nominal value representing volts/cell and a time stamp signal. The battery chemistry information is maintained in order to identify battery types (e.g., NiCd, NiMH, etc.) to the controller 18 when a battery pack is connected to the device 100. As will be appreciated, differing battery chemistries exhibit different self discharge rates. The battery chemistry information will assist the controller 18 to determine an appropriate battery discharge rate for a particular battery pack, based upon received battery chemistry information.

As a practical consideration, battery discharge rates may be stored in the look-up table 200 of ROM 30. In accordance, the battery identification information stored in memory unit 37 is used by the controller 18 to index the appropriate discharge rate in the look-up table 200. Otherwise, the self discharge rate may be stored within memory unit 37 for communication to controller 18 when the battery pack is connected to the device 100.

Battery capacity information is typically of two types. The first type, Cb, is a value representing the total or fully charged capacity for the entire battery pack as established by the battery pack manufacturer. Typical values for Cb may include 600, 700 or 1200 maH. The second type of battery capacity information, Cr, is a value representing the remaining capacity for a battery pack. Cr may be expressed in accordance with equations 2 and 3 above.

With reference to FIG. 1, battery pack 35 comprises a plurality of battery cells 36. The number of cells employed is typically a manufacturing design choice. Notwithstanding, it will be appreciated by those skilled in the art that there is a direct correlation between the number of battery cells employed and the overall capacity of a battery pack.

By way of example, a 600 maH battery pack consisting of 7 cells will have approximately 40 percent more capacity than a 600 maH battery pack consisting of only 5 cells. In addition, the voltage levels supplied by these respective battery packs will be different. In order to permit battery packs of differing configurations to be utilized, by the communicator 100, the power supply 32 Of FIG. 1 is a switching type power supply of a kind well known in the art.

Such a device is capable of efficiently converting different input voltage levels into the voltages required by the communicator 100. Thus, despite differing input voltage levels, the supply voltages delivered by power supply 32 to the communicator 100 will remain constant, regardless of the number of cells or the battery chemistry employed by battery pack 35.

Of importance, however, a change in battery input voltage, will necessitate a scaling of the current draw values as stored in the look-up table 200 of FIG. 2. This is due in part to the fact that the power requirements for the communicator will remain constant despite the change in battery input voltage. For the power supply power to remain constant despite changes in the input voltage, the current requirements for the individual circuit modules supplied by the power supply are scaled in accordance with the following equation.

$$Ij2 = \frac{N1 \times VC1}{N2 \times VC2} \times Ij1 \quad (7)$$

where,

N1 is the anticipated number of battery pack cells;

VC1 is the anticipated value of volts/cell;

N2 is the actual number of battery pack cells;

VC2 is the actual value of volts/cell;

Ij1 is the circuit module current draw for the anticipated battery pack voltage;

Ij2 is the scaled circuit module current draw and;

$$\frac{N1 \times VC1}{N2 \times VC2}$$

Proceeding with the example, assuming the current draw values represented in FIG. 2 are established for a 600 maH battery pack consisting of 5 cells, utilization of a 600 maH battery pack consisting of 7 cells will require multiplying the current draw values stored in the look-up table by the above scaling factor. In order to assure proper scaling is achieved, it is a function of the present invention to store in memory unit 37 a value representing the number of battery cells 36 utilized by battery pack 35, as well as a value representing nominal volts/cell (VC1, VC2).

Assuming the 5 cell battery pack and the 7 cell battery pack utilize identical values for volts/cell (e.g, VC1=VC2) then the above scaling factor may be reduced to N1/N2, the ratio of the number of anticipated cells to the number of cells actually utilized by the battery pack. Alternatively, when a battery pack having the anticipated number of cells (e.g., N1=N2) but a different value of volts/cell is employed, the above scaling factor may be reduced to VC1/VC2, the ratio of the anticipated value for volts/cells to the value of volts/cell actually utilized by the battery pack. When a battery pack's configuration conforms to the anticipated battery pack configuration (e.g., N1=N2 and VC1=VC2) no scaling is required. In all other cases, the scaling factor determined pursuant to equation 7 above is used. Thus, whenever a battery pack is connected to the communicator 100, information regarding the number of cells and the nominal value of volts/cell is communicated to the controller 18 which operates under the control of an operating instruction set stored on ROM 30 to assure that proper scaling is employed during use of the battery-consumption-indicating arrangement of the present invention.

In accordance with yet another embodiment of the battery-consumption-indicating arrangement of the present invention, the battery cell information stored in memory unit 37 may be utilized by the controller 18 to index a ROM 30 look-up table (not shown) substantially identical to the look-up table 200 of FIG. 2. As will be appreciated, this look-up table will consist of circuit module current draw values which have previously been scaled to correspond to the current draws anticipated for a battery pack having the requisite number of battery cells and value of volts/cell.

In accordance with yet another embodiment actual battery pack voltage levels are employed to determine the appropriate scaling factor.

A time stamp signal is presented to the memory unit 37 from either the controller 18 during normal operation, or from a charging device (not shown) when the battery is recharged. The time stamp signal operates to associate a time with the battery capacity information stored within memory unit 37. During normal operation, it is a function of controller 18 to periodically update the time stamp and battery capacity information stored within memory unit 37. This time stamp to battery capacity association will be maintained during those periods when the battery pack is removed from service.

When a battery pack is reconnected to the device 100, the controller 18 will read the time stamp, battery identification and battery capacity information from memory unit 37. As previously mention, the battery identification information will assist the controller 18 ascertain the appropriate current draw scaling information during battery-consumption-indication as well as the appropriate battery discharge rate during battery-discharge-indication in accordance with the present invention. The time stamp information read from memory unit 37 will be compared to the time maintained by real time clock 31 in order to ascertain the time interval during which the battery was not in use. The battery capacity information provides an indication of the battery capacity as it was when the battery was removed from service.

By way of example, with reference to FIG. 3, the appropriate battery discharge rate $I_5$ for battery 35 is depicted in a fashion similar to that for circuit module current draws $I_1$–$I_4$. As is anticipated the amplitude of the battery discharge rate $I_5$ is considerably lower than that exhibited by circuit module current draws $I_1$–$I_4$. In addition, a time interval $T_5$ representing a time during which the battery pack is not in use is shown. As will be anticipated the duration of the time interval $T_5$ is considerably longer than that exhibited by active circuit modules.

In accordance with FIG. 3 and the technique described in association with equation 6 above, a value for lost battery capacity may be calculated as $Cu=T_5*I_5$. The value Cu will be subtracted from the capacity value as stored in memory unit 37 and an updated battery capacity indication will be presented to the user of the device 100 via display unit 21. Thereafter, updated battery capacity and time stamp information will be stored in memory unit 37.

Figure 4:
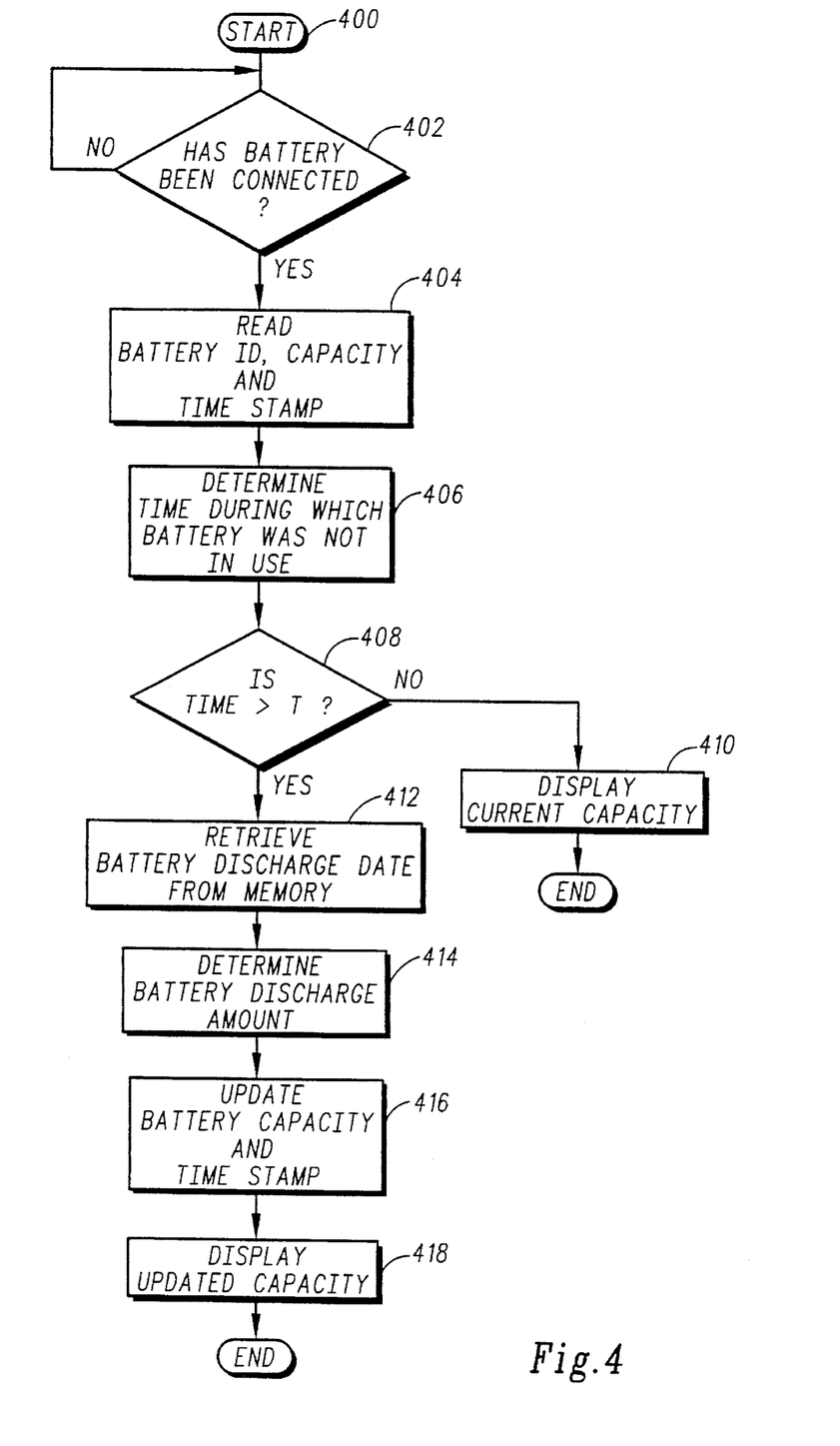
FIG. 4 is a flow chart diagram illustrating the steps performed by the device of FIG. 1 in accordance with the a battery-discharge-indicating arrangement of the present invention.

With reference to FIG. 4, a flow chart diagram illustrating the steps performed by the device 100 of FIG. 1 in accordance with the a battery-discharge-indicating arrangement of the present invention is provided. Commencing at start block 400 flow proceeds to decision block 402 where a check is performed by controller 18 to determine whether a battery has been connected to the device 100. Assuming it has, flow proceeds to block 404, where battery memory 37 is read to ascertain the battery identification information, battery capacity information and time stamp signal stored therein. As previously mentioned, the battery capacity and time stamp information, together, provide an indication of the batteries capacity at or around a time when it was removed from service. The battery identification information will identify a battery chemistry type (index) and may include the battery discharge rate if such information is not maintained within the look-up table 200 of FIG. 2.

Flow proceeds from block 404 to block 406 where the controller 18 determines a time during which the battery was not in service. As previously discussed this is accomplished by measuring the time differential between a current time measurement taken by the real time clock 31 and the time stamp signal retrieved from battery memory at block 404. Flow then proceeds to decision block 408 where a check is performed to determine whether the time during which the battery was not in service exceeds a predetermined threshold. If it does not, it may be assumed that the battery has not been dormant long enough to have experienced any appreciable capacity discharge. Thus, flow will proceed to block 410, where the current value for battery capacity read at block 404 will be displayed to the device user.

Assuming the time during which the battery was not in service exceeds the predetermined threshold, flow proceeds from block 408 to block 412 where the appropriate battery discharge rate is retrieved from memory. In accordance with the preferred embodiment, look-up table 200 of FIG. 2 is indexed in accordance with the battery identification information read at block 404 to retrieve a battery discharge rate. Of course, when the battery discharge rate is stored within battery memory 37, the discharge rate will be directly available.

Flow then proceeds from block 412 to block 414 where the controller 18 determines the amount of battery discharge for that time during which the battery was not in service ($Cu=I_5*T_5$). At block 416 the battery discharge amount is subtracted from the battery capacity amount read at block 404 to provide updated battery capacity information. This updated information along with a new time stamp will be communicated to battery memory 37 via the I/O interface 38 of FIG. 1 for storage. At block 418, the updated value of battery capacity is then displayed via display unit 21 to the device 100 user. Thereafter, the battery-consumption-indicating arrangement as disclosed herein will continue to update the battery capacity and time stamp information stored in memory 37 as the battery 35 controllably puts into operation the various circuit module employed by the device 100.

With reference to FIG. 5, a flow chart diagram illustrating the steps performed by the device 100 of FIG. 1 in accordance with the a battery-consumption-indicating arrangement of the present invention is provided. Commencing at start block 500 flow proceeds to block 502 where a variable N is initialized, set to one. At block 504 an initial set of circuit modules, as enabled by controller 18, is determined. Flow then proceeds to block 506 where a timer is started to define a time interval T(N) during which said initial set of circuit modules are put into operation. By way of example, FIG. 3 depicts an initial set of circuit modules comprising three entities. The three circuit modules are represented as $I_1$–$I_3$, the current draw values associated with each of the respective circuit modules comprising the initial set.

Flow then proceeds to decision block 508 where a check is performed by controller 18 to determine whether the set of enabled circuit modules has changed. If not, the timer at block 506 continues to track the interval T(N) during which the enabled set of circuit modules is put into operation. Upon detection of a change in the set of enabled circuit modules, flow proceeds to decision block 510 where a check is performed to determine whether scaling of the current draw values as stored in table 200 of FIG. 2 is required.

As previously discussed, it is a function of the present invention to permit the communicator 100 to be powered by battery packs having differing battery chemistries and cell configurations. In order to achieve this end, it will be necessary to scale the current draw values utilized during battery consumption calculations whenever a battery pack having a cell configuration different from that anticipated during the compilation of the current draw values listed in table 200 is connected to the communicator 100.

At decision block 510, a check is performed to determine the cell configuration of the battery pack 35. In accordance with the preferred embodiment, each battery pack maintains battery specific identification information comprising a number of battery cells and a value representing volts/cell. This information is communicated to the controller 18 at block 404 of the battery-discharge-indicating arrangement as described above with reference to FIG. 4. At decision block 510, the number of battery cells and the value representing volts/cell, as determined from the information read at block 404 of FIG. 4, is compared to a reference to determine whether scaling is required. It should be appreciated by those skilled in the art that when the compared values are unequal, scaling is typically required.

Assuming scaling is required, flow proceeds to block 512 where the controller 18 determines the appropriate scaling factor. In accordance with the present invention a scaling factor may be determined as the ratio of the number of anticipated cells to the number of cells actually utilized by the battery pack when VC1=VC2. Alternatively, the scaling factor may be determined as the ratio of the anticipated value for volts/cells to the value of volts/cell actually utilized by the battery pack when N1=N2. When a battery pack's configuration conforms to the anticipated battery pack configuration (e.g., N1=N2 and VC1=VC2) no scaling is required. In all other cases, the scaling factor determined pursuant to equation 7 above is used.

By way of example, let us assume that the values listed in table 200 were determined for a 5 cell battery pack. Let us further assume that all battery packs exhibit an identical value for nominal volts/cell (i.e., VC1=VC2). In accordance with this example, whenever a 5 cell battery is connected to communicator 100, the values listed in table 200 are the correct current draw amounts and no scaling will be required at step 510. If a 7 cell battery is thereafter connected to the communicator 100, block 510 will determine that scaling is required. As previously stated a 7 cell battery pack outputs a higher voltage value than does a 5 cell battery pack. In order for the power supplied by power supply 32 to remain constant, it is necessary to multiply each current draw value listed in table 200 by the scaling factor of 5/7 or 0.714285.

By way of yet another example, let us assume that the values listed in table 200 were determined for a 7 cell battery. Let us again assume that all battery packs exhibit an identical value for nominal volts/cell (i.e., VC1=VC2). In accordance with this example, whenever a 7 cell battery is connected to communicator 100, the values listed in table 200 are the correct current draw amounts and no scaling is required at step 510. If a 5 cell battery is thereafter connected to the communicator 100, block 510 will determine that scaling is required. Since a 5 cell battery pack outputs a lower voltage value than does a 7 cell battery pack it will be necessary to multiply each current draw value listed in table 200 by the scaling factor of 7/5 or 1.4 in order to assure that a constant value of power is deliverable by the power supply 32. Of note, for those circuit modules which do not receive power from the power supply 32, scaling is never required.

Flow then proceeds from block 510 when no scaling is required or from block 512 after determination of the proper scaling factor to block 514 where Cu, the battery consumption amount during time interval T(N) is determined in accordance with equation 6, wherein $Cu=T_1*(I_1+I_2+I_3)$. As previously mentioned, it may be necessary to multiply the current draw values expressed in equation 6 by an appropriate scaling factor based upon the number of cells or the volts/cell employed by the battery pack 35.

Flow then proceeds from block 514 to block 516 where the current battery capacity information stored in battery pack memory unit 37 is read. At block 518 the battery consumption amount determined at block 514 is subtracted from the battery capacity amount read at block 516 to provide updated battery capacity information. This updated information along with a new time stamp signal will be communicated to battery pack memory unit 37 via the I/O interface 38 of FIG. 1 for storage. At block 520, the updated value of battery capacity is then displayed via display unit 21 to the device 100 user. Flow then proceeds to block 522 where the value of the variable N is incremented. From block 522, flow branches back to block 504 where the battery-consumption-indicating process repeats itself for a next set of enabled circuit modules.

It will be appreciated by those skilled in the art that the battery-status-indicating arrangements disclosed herein are a powerful tool for maintaining accurate and reliable information regarding battery capacity for removable and rechargeable battery packs.

What is claimed is:

1. A battery-discharge-indicating system for use with electronic circuitry that is controllably put into operation by a removable battery pack, said battery-discharge-indicating system being for displaying a remaining battery capacity status for said battery pack, said system comprising:

in said removable battery pack:
memory means for storing battery identification information, battery capacity information and a time stamp signal;

in said electronic circuitry:
timing means, for generating the time stamp signal for delivery to said battery pack on a periodic basis and further for maintaining a current time measurement;

memory means, coupled to the electronic circuitry, for storing battery discharge rate signals, wherein said discharge rate signals are indexed based upon the battery identification information;

processing means, coupled to the electronic circuit memory means and the timing means and further responsive to signals received from the battery pack, for determining a battery discharge amount, for a time interval when the battery pack is removed from service, as a product of a time-duration signal indicative of the time interval during which the battery pack is removed from service and a selected battery discharge signal;

means, coupled to the processing means, for updating the battery capacity information; and means, coupled to the updating means, for displaying the updated battery capacity information.

2. The battery-discharge-indicating system of claim 1 further comprising means for reading the memory means in said removable battery pack when said removable battery pack is returned to service in order to access the battery identification information, the battery capacity information and the time stamp signal.

3. The battery-discharge-indicating system of claim 2 further comprising means for determining the time interval when the removable battery pack is removed from service, as a difference between the current time measurement and the time stamp signal retrieved from the memory means in said removable battery pack.

4. The battery-discharge-indicating system of claim 2 further comprising means for indexing the battery discharge signals from the memory means as a function of accessing the battery identification information from the removable battery pack.

5. The battery-discharge-indicating system of claim 1 wherein the battery capacity information stored in the battery pack is updated by subtracting the battery discharge amount from the stored battery capacity information.

6. The battery-discharge-indicating system of claim 1 further comprising means for writing the updated battery capacity information to the memory means in said removable battery pack.

7. The battery-discharge-indicating system of claim 1 wherein said battery identification information comprises at least one of battery chemistry information and battery discharge rates.

8. The battery-discharge-indicating system of claim 7 wherein the battery chemistry information comprises battery chemistry types selected from the group consisting of Nickel-Cadmium (NiCd), Lead Acid, Zinc Air, Nickel Metal Hydride (NiMH), Nickel-Zinc, Lithium/MNO$_2$, Lithium Ion, Lithium Polymer, and Lithium/Iron Sulfide.

9. A battery-consumption-indicating system for use with electronic circuitry that is controllably put into operation by one of a plurality of different removable battery packs, said battery-consumption-indicating system for displaying a remaining battery capacity status for said one of said plurality of different removable battery packs, said system comprising:

in said one of said plurality of removable battery packs:
memory means for storing battery identification signals, battery capacity signals and time stamp signals;

in said electronic circuitry:
memory means, coupled to the electronic circuitry, for storing current draw signals representative of a current draw at which individual electronic circuit modules are controllably put into operation;
means, coupled to the memory means, and responsive to signals received from said one of said plurality of removable battery packs, for scaling the stored current draw signals as a function of said stored battery identification signals;
processing means, coupled to the memory means and further responsive to said signals received from the battery pack, for determining a battery consumption amount during the operation of the electronic circuitry; and
means, coupled to the processing means, for updating the battery's battery capacity information as a function of the consumption amount and displaying the updated battery capacity information.

10. The battery-consumption-indicating system of claim 9 wherein said battery identification information comprises at least one of battery chemistry information, a number of battery cells employed by the removable battery pack, and a value representing volts per battery pack cell.

11. The battery-consumption-indicating system of claim 9 further comprising means for generating a scaling factor as a ratio of a number of anticipated battery pack cells to a number of actual battery pack cells.

12. The battery-consumption-indicating system of claim 9 further comprising means for generating a scaling factor as a ratio of an anticipated value of volts per battery cell to an actual value of volts per battery cell.

13. The battery-consumption-indicating system of claim 9 further comprising means for generating a scaling factor as a ratio of a number anticipated battery pack cells and an anticipated value of volts per cell to a number of actual battery pack cells and an actual value of volts per cell.

14. The battery-consumption-indicating system of claim 9 further comprising means for generating a scaling factor as a ratio of an anticipated battery pack voltage to an actual battery pack voltage.

15. The battery-consumption-indicating system of claim 9 further comprising means for retrieving the scaled current draw signal from memory as a function of receipt of the battery identification information.

16. The battery-consumption-indicating system of claim 9 further comprising means for writing the updated battery capacity information and the time stamp signals to the battery pack's memory.

17. For use with electronic circuitry that is controllably put into operation by a removable battery pack, a battery-discharge-indicating system for displaying a battery capacity status after a period of battery pack non-use comprising the steps of:

storing battery chemistry information, battery capacity information, and a time stamp signal in memory of said removable battery pack;

storing battery discharge rate signals in memory in the electronic circuitry, each signal representative of a discharge rate exhibited by a different battery chemistry type;

upon returning the removable battery pack to service:

reading the battery chemistry information, the battery capacity information, and the time stamp signal stored in memory of said removable battery pack;

determining a battery discharge amount for a time interval during which the removable battery pack is removed from service;

updating the battery capacity information and the time stamp signal stored in the memory of said removable battery pack; and displaying the updated battery capacity information.

18. The method of claim 17 further comprising the steps of the electronic circuitry:

generating the time stamp signal for delivery to the memory of said removable battery pack on a periodic basis; and determining current time measurements.

19. The method of claim 17 wherein the step of storing battery discharge rate signals in the memory of said electronic circuitry further comprises the step of indexing the battery discharge rate signals as a function of the battery chemistry information.

20. The method of claim 17 wherein the step of determining the battery discharge amount further comprises the steps of:

determining a time interval during which the removable battery pack is removed from service as a difference between a current time measurement and the time stamp signal retrieved from the memory of said removable battery pack, thereby producing a time-duration signal indicative of the time interval during which the battery pack is removed from service;

selecting the battery discharge rate signal from memory as a function of the battery chemistry information read from the removable battery pack memory; and multiplying the selected battery discharge rate signal and said time-duration signal to produce a product signal representative of the battery discharge amount.

21. The method of claim 17 wherein the step of updating the battery capacity information further comprises the steps of:

reading the battery capacity information from the memory of said removable battery pack when the battery pack is returned to service;

subtracting the battery discharge amount from the battery capacity information to produce the updated battery capacity information; and storing the updated battery capacity information in the memory of said removable battery pack.

22. The battery-discharge-indicating system of claim 10 wherein the battery chemistry information comprises battery chemistry types selected from the group consisting of Nickel-Cadmium (NiCd), Lead Acid, Zinc Air, Nickel Metal Hydride (NiMH), Nickel-Zinc, Lithium/$MNO_2$, Lithium Ion, Lithium Polymer, and Lithium/Iron Sulfide.

* * * * *